United States Patent
Adachi et al.

(10) Patent No.: US 6,421,530 B1
(45) Date of Patent: Jul. 16, 2002

(54) RADIO CIRCUIT HAVING A LOCAL OSCILLATOR FREQUENCY WHICH DIFFERS FROM THE TRANSMIT FREQUENCY OR THE RECEIVE FREQUENCY AND MOBILE RADIO APPARATUS

(75) Inventors: Hisashi Adachi, Mino; Hiroaki Kosugi, Hirakata; Kaoru Ishida, Shijonawate; Hiroshi Haruki; Junichi Yasuno, both of Yokohama; Kazuhiko Ikeda, Matsuto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/933,848

(22) Filed: Sep. 19, 1997

(30) Foreign Application Priority Data

Sep. 20, 1996 (JP) .............................. 8-249386

(51) Int. Cl.$^7$ ................................................ H04B 1/40
(52) U.S. Cl. ......................... 455/86; 455/260; 455/76; 329/325
(58) Field of Search .......................... 455/575, 76, 343, 455/75, 86, 550, 260, 265, 113, 118; 332/128, 117, 119, 126, 127; 331/2, 23, 25, 1 A; 329/325, 323; 375/324, 306, 307

(56) References Cited

U.S. PATENT DOCUMENTS

| | | | |
|---|---|---|---|
| 4,627,099 A | * 12/1986 | Shimakata | ................. 455/76 |
| 5,065,408 A | * 11/1991 | Gillig | ..................... 375/222 |
| 5,150,082 A | * 9/1992 | Grimmett et al. | ........... 332/128 |
| 5,180,993 A | * 1/1993 | Dent | ............................. 331/16 |
| 5,432,779 A | * 7/1995 | Shimo et al. | ................. 455/86 |
| 5,511,236 A | * 4/1996 | Umstattd et al. | ............. 455/76 |
| 5,519,885 A | * 5/1996 | Vaisanen | ..................... 455/76 |
| 5,606,739 A | * 2/1997 | Goto | .......................... 455/343 |
| 5,610,559 A | * 3/1997 | Dent | ............................. 331/2 |
| 5,761,615 A | * 6/1998 | Jaffee | ......................... 455/314 |
| 5,819,161 A | * 10/1998 | Saito | ........................... 455/86 |
| 5,834,987 A | * 11/1998 | Dent | .......................... 332/127 |
| 5,987,309 A | * 11/1999 | Adachi et al. | ................ 455/86 |

FOREIGN PATENT DOCUMENTS

JP 04336715 A 11/1992

OTHER PUBLICATIONS

Behzad Razavi, RF Microelectronics, Prentice Hall PTR, pp. 290–295, 1998.*

* cited by examiner

*Primary Examiner*—William Trost
*Assistant Examiner*—Philip J. Sobutka
(74) *Attorney, Agent, or Firm*—Smith, Gambrell & Russell, LLP

(57) ABSTRACT

The present invention concerns a radio circuit including a local oscillator, a first receive frequency converter, a frequency divider and a demodulator. A receive signal and an output of the local oscillator are input to the first receive frequency converter. The receive signal is converted into a first intermediate signal by the first receive frequency converter, and the first intermediate frequency signal is input to the demodulator. The output of the local oscillator is frequency-divided by the frequency divider and also input to the demodulator. The signal converted into the first intermediate frequency is demodulated into a baseband signal by the demodulator.

14 Claims, 5 Drawing Sheets

RADIO CIRCUIT HAVING A LOCAL OSCILLATOR FREQUENCY WHICH DIFFERS FROM THE TRANSMIT FREQUENCY OR THE RECEIVE FREQUENCY AND MOBILE RADIO APPARATUS

BACKGROUND OF THE INVENTION

1. Field of the Invention

The present invention in general relates to a radio circuit in which the frequency of a local oscillator differs from the transmit frequency or the receive frequency and to a mobile radio apparatus using the same.

2. Related Art of the Invention

In recent years, the mobile communication has rapidly become pervasive and for the radio circuit, it is important to achieve smaller size and lower power consumption. Hereinafter, an example of a conventional radio circuit will be described with reference to the drawing.

FIG. 5 shows the construction of the conventional radio circuit. In FIG. 5, reference numeral 41 represents a first local oscillator, reference numeral 42 represents a second transmit local oscillator, reference numeral 43 represents a second receive local oscillator, reference numeral 44 represents a receive frequency converter, reference numeral 45 represents a demodulator, reference numeral 46 represents a transmit frequency converter, reference numeral 47 represents a modulator, reference numeral 48 represents a receive amplifier, reference numeral 49 represents a transmit amplifier, reference numeral 50 represents a duplexer, and reference numeral 51 represents an antenna.

The modulator 47 modulates the output signal of the second transmit local oscillator 42 with a modulating signal to output a transmit intermediate frequency signal. The transmit intermediate frequency signal is converted into a transmit frequency by the first local oscillator 41 at the transmit frequency converter 46, amplified by the transmit amplifier 49, passed through the duplexer 50 and sent out from the antenna 51. The receive signal received by the antenna 51 is passed through the duplexer 50 and amplified by the receive amplifier 48. The amplified receive signal is input to the receive frequency converter 44 to be frequency-converted into a receive intermediate frequency signal with the output of the first local oscillator 41. The demodulator 45 demodulates the receive intermediate frequency signal into a baseband signal with the output of the second receive local oscillator 43.

However, with this arrangement, three local oscillators 41, 42 and 43 are required and it is therefore difficult to achieve size reduction. In addition, since the local oscillators generate different frequencies, spurious emission readily occurs in transmitting signals and interference readily arises in receiving signals.

SUMMARY OF THE INVENTION

In view of the above-mentioned problems of the conventional radio circuit, it is an object of the present invention to provide a radio circuit suitable for size reduction and in which undesired spurious emission does not occur.

A radio circuit of the present invention comprises a local oscillator, a first receive frequency converter, a frequency divider and a demodulator, wherein a receive signal and an output of the local oscillator are input to the first receive frequency converter, the receive signal is converted into a signal of a first intermediate frequency by the first receive frequency converter, the signal of the first intermediate frequency is input to the demodulator, the output of the local oscillator is frequency-divided by the frequency divider and input to the demodulator, the signal converted into the first intermediate frequency is demodulated into a baseband signal by the demodulator.

A radio circuit of the present invention comprises a local oscillator, a first receive frequency converter, a second receive frequency converter, a frequency divider and a demodulator, wherein a receive signal and an output of the local oscillator are input to the first receive frequency converter, the receive signal is converted into a signal of a first intermediate frequency by the first receive frequency converter, the signal of the first intermediate frequency is input to the second receive frequency converter, the output of the local oscillator is frequency-divided by the frequency divider and input to the second receive frequency converter, the signal of the first intermediate frequency is frequency-converted into a signal of a second intermediate frequency by the second receive frequency converter, the signal converted into the second intermediate frequency and a reference signal of the local oscillator are input to the demodulator, the signal of the second intermediate frequency is demodulated into a baseband signal by the demodulator, and a frequency of the reference signal equals the second intermediate frequency.

A radio circuit of the present invention comprises a local oscillator, a transmit frequency converter, a frequency divider and a modulator, wherein an output of the local oscillator is input to the transmit frequency converter and is also input to the frequency divider to be frequency-divided, an output signal of the frequency divider is input to the modulator, the output signal of the frequency divider is modulated into a transmit intermediate frequency signal by the modulator with a modulating signal, and the transmit intermediate frequency signal is input to the transmit frequency converter to be frequency-converted into a signal of a transmit frequency.

A radio circuit of the present invention comprises a local oscillator, a frequency divider, a modulator and a local frequency converter, wherein an output of the local oscillator is input to the frequency divider to be frequency-divided, the local frequency converter. receives the output of the local oscillator and an output of the frequency divider to output a signal of a transmit frequency, and the modulator modulates an output of the local frequency converter with a modulating signal to output a signal of the transmit frequency.

DESCRIPTION OF THE REFERENCE NUMERALS

Figure 1:
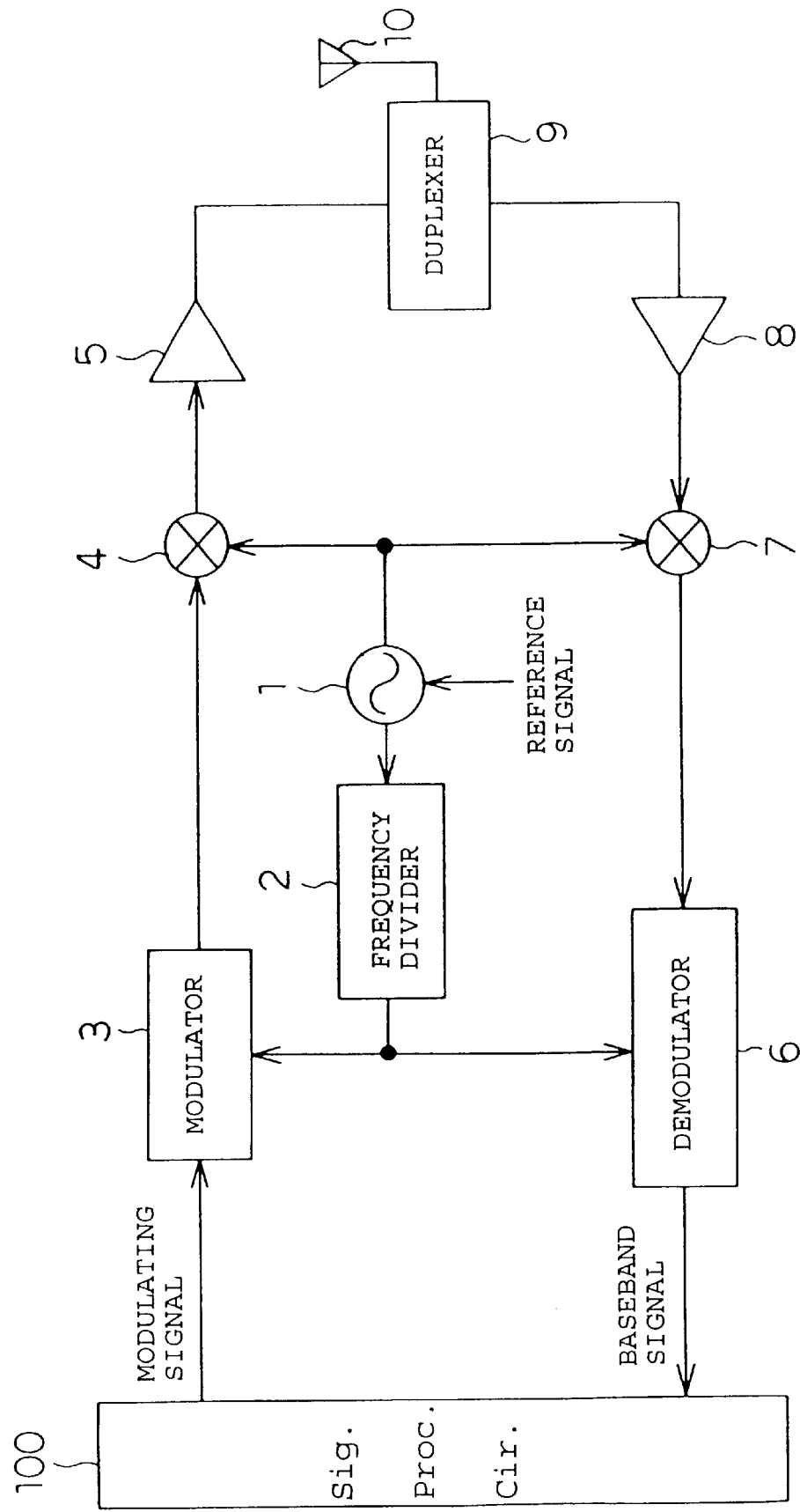
FIG. 1 is a construction view of a radio circuit according to a first embodiment of the present invention.

1 Local oscillator
2 Frequency divider 3, 32, 47 Modulators
4, 46 Transmit frequency converters
5 Transmit amplifier
6, 21, 45 Demodulators
7, 44 Receive frequency converters
8, 48 Receive amplifiers
9, 50 Duplexers
10, 51 Antennas
22 Second receive frequency converter
23 First receive frequency converter
31 Local frequency converter
41 First local oscillator
42 Second transmit local oscillator
43 Second receive local oscillator

PREFERRED EMBODIMENTS OF THE INVENTION

Hereinafter, embodiments of the present invention will be described with reference to the drawings.

FIG. 1 shows the construction of a radio circuit according to a first embodiment of the present invention. In FIG. 1, reference numeral 1 represents a local oscillator, reference numeral 2 represents a frequency divider, reference numeral 3 represents a modulator, reference numeral 4 represents a transmit frequency converter, reference numeral 5 represents a transmit amplifier, reference numeral 6 represents a demodulator, reference numeral 7 represents a receive frequency converter, reference numeral 8 represents a receive amplifier, reference numeral 9 represents a duplexer, and reference numeral 10 represents an antenna.

The output of the local oscillator 1 is input to the frequency divider 2, the transmit frequency converter 4 and the receive frequency converter 7. The frequency divider 2 frequency-divides the output of the local oscillator 1 and outputs it to the modulator 3 and the demodulator 6. The modulator 3 modulates the signal input from the frequency divider 2 with a modulating signal to output a transmit intermediate frequency signal. The transmit intermediate frequency signal is input to the transmit frequency converter 4 to be frequency-converted into a signal of a transmit frequency with the output signal of the local oscillator 1, amplified by the transmit amplifier 5, passed through the duplexer 9 and sent out from the antenna 10. The receive signal received by the antenna 10 is passed through the duplexer 9, amplified by the receive amplifier 8 and converted into a signal of the receive intermediate frequency by the receive frequency converter 7 with the output of the local oscillator 1. The signal converted into the receive intermediate frequency is input to the demodulator 6 to be demodulated into a baseband signal with the output signal of the frequency divider 2. Reference numeral 100 represents a signal processing circuit for handling the baseband signal and the modulating signal.

The frequency division number of the frequency divider 2 is N and the transmit frequency equals the sum of the output frequency of the local oscillator 1 and the output frequency of the frequency divider 2. The receive frequency equals the sum of the output frequency of the local oscillator 1 and the output frequency of the frequency divider 2. The local oscillator 1 is a PLL (phase-locked loop) frequency synthesizer which frequency-divides a reference signal into a phase comparison frequency. The phase comparison frequency equals $\{f \times N/(N+1)\}/m$, wherein f is the transmit and receive frequency channel spacing and m is an integer including 1.

As described above, according to this embodiment, the receive signal is frequency-converted into the receive intermediate frequency with the output of the local oscillator 1 and demodulated with the signal obtained by frequency-dividing the output of the local oscillator 1. With this feature, the receive signal may be demodulated after being converted into a low-frequency signal, so that the realization of the demodulator is facilitated and current consumption is reduced. In addition, since the receive frequency and the output frequency of the local oscillator 1 are different, the leakage of the output signal of the local oscillator 1 from the antenna 10 is reduced. Moreover, modulation is performed at a frequency obtained by frequency-dividing the output of the local oscillator 1 by the frequency divider 2 and the modulated signal is frequency-converted into the transmit signal with the output of the local oscillator 1. With this feature, the modulator 3 may operate at a low frequency, so that current consumption is reduced. In addition, since the transmit frequency and the output frequency of the local oscillator 1 are different, the operation of the local oscillator 1 is prevented from being hindered by the transmit signal. Since these effects are achieved with a single local oscillator 1, the radio circuit is reduced in size and spurious emission due to the provision of a plurality of local oscillators does not occur.

The transmit frequency may equal the difference in frequency between the output signals of the local oscillator 1 and the frequency divider 2 and the phase comparison frequency of the local oscillator 1 may equal $\{f \times N/(N-1)\}/m$, wherein f is the transmit and receive frequency channel spacing and m is an integer including 1. Moreover, the receive frequency may equal the difference in frequency between the outputs of the local oscillator 1 and the frequency divider 2 and the phase comparison frequency of the local oscillator 1 may equal $\{f \times N/(N-1)\}/m$, wherein f is the transmit and receive frequency channel spacing and m is integer including 1.

Next, a radio circuit according to a second embodiment of the present invention will be described with reference to the drawings.

Figure 2:
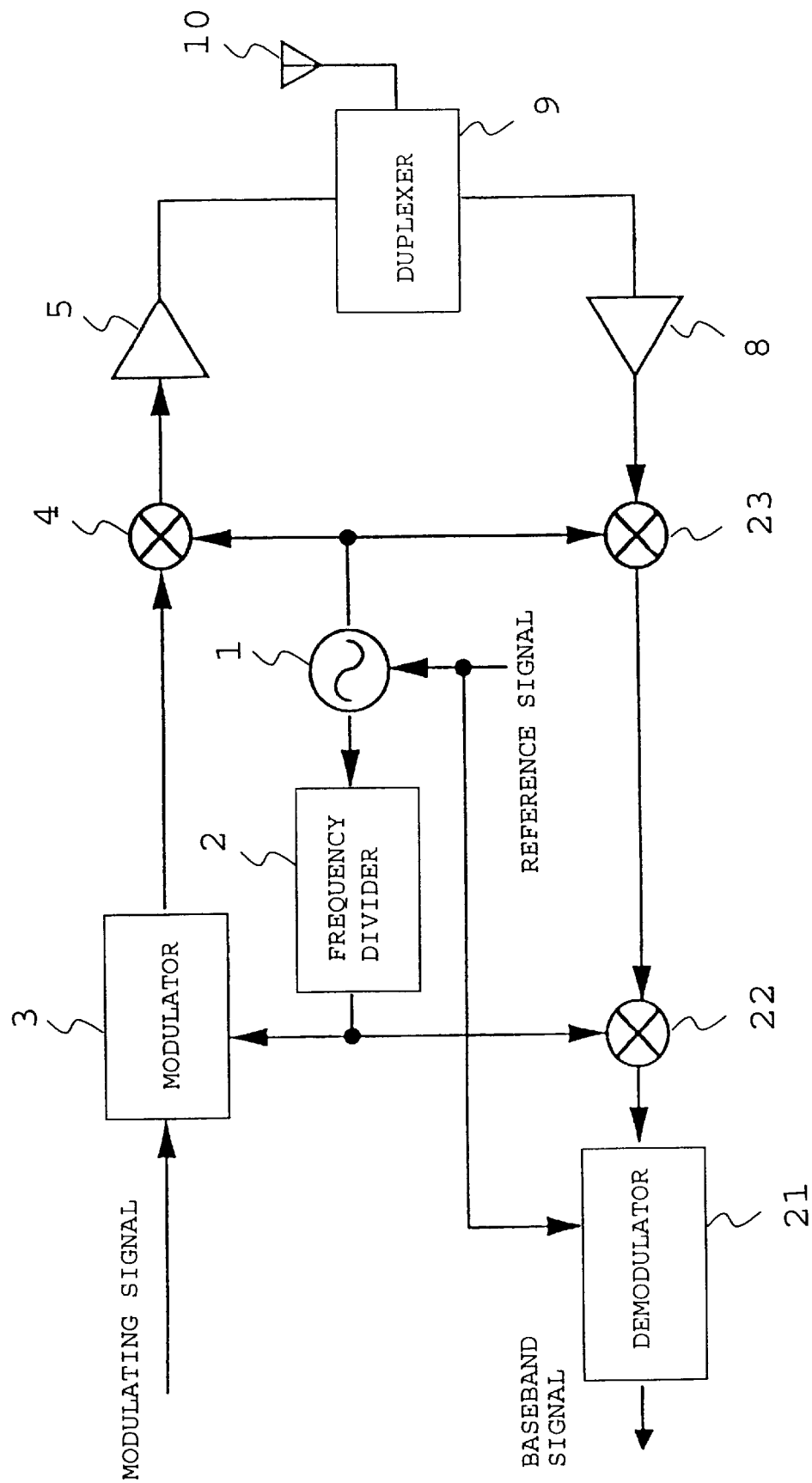
FIG. 2 is a construction view of a radio circuit according to a second embodiment of the present invention.

FIG. 2 shows the construction of the radio circuit according to the second embodiment of the present invention. In FIG. 2, the transmitting section has a similar construction to that of FIG. 1 and the receiving section has a different construction. The same elements as those of FIG. 1 are indicated by the same reference numerals and will not be described in detail. Reference numeral 1 represents a local oscillator, reference numeral 2 represents a frequency divider, reference numeral 3 represents a demodulator, reference numeral 4 represents a transmit frequency converter, reference numeral 5 represents a transmit amplifier, reference numeral 21 represents a demodulator, reference numeral 22 represents a second receive frequency converter, reference numeral 23 represents a first receive frequency converter, reference numeral 8 represents a receive amplifier, reference numeral 9 represents a duplexer, and reference numeral 10 represents an antenna.

The output of the local oscillator 1 is input to the frequency divider 2, the transmit frequency converter 4 and the first receive frequency converter 23. The frequency divider 2 frequency-divides the output of the local oscillator 1 and outputs it to the modulator 3 and the second receive frequency converter 22. The modulating signal is passed through the moduator 3, the transmit frequency converter 4, the transmit amplifier 5 and the duplexer 9 to be converted into a transmit signal and sent out from the antenna 10.

The receive signal received by the antenna 10 is passed through the duplexer 9, amplified by the receive amplifier 8 and converted into a signal of a first receive intermediate frequency by the first receive frequency converter 23 with the output signal of the local oscillator 1. The signal converted into the first receive intermediate frequency is input to the second receive frequency converter 22 and converted into a signal of a second receive intermediate frequency signal with the output signal of the frequency divider 2. The second intermediate frequency is a fixed frequency equal to a reference signal, and is input to the demodulator 21 to be demodulated into a baseband signal with the reference signal.

The frequency division number of the frequency divider 2 is N and the transmit frequency equals the sum of the output frequency of the local oscillator 1 and the output frequency of the frequency divider 2. The receive frequency equals the sum of the output frequency of the local oscillator 1, the output frequency of the frequency divider 2 and the frequency of the reference signal. The local oscillator 1 is a PLL frequency synthesizer which frequency-divides the reference signal into a phase comparison frequency. The phase comparison frequency equals $\{f \times N/(N+1)\}/m$, wherein f is the transmit and receive frequency channel spacing and m is integer including 1.

As described above, according to this embodiment, the receive signal is frequency-converted into the first receive intermediate frequency with the output of the local oscillator 1, frequency-converted into the second receive intermediate frequency with the signal obtained by frequency-dividing the output of the local oscillator 1, and demodulated into the baseband signal with the reference signal. With this feature, the receive signal may be demodulated after being converted into a low-frequency signal, so that the realization of the demodulator is facilitated and current consumption is reduced. Since the second intermediate frequency is a fixed frequency, disturbing waves may be removed by providing a narrow-band band-pass filter at the entrance of the demodulator 21. Since the receive frequency and the output frequency of the local oscillator 1 are different, the leakage of the output signal of the local oscillator 1 from the antenna 10 is reduced. Moreover, modulation is performed at a frequency obtained by frequency-dividing the output of the local oscillator 1 by the frequency divider 2 and the modulated signal is frequency-converted into the transmit signal with the output of the local oscillator 1. With this feature, the modulator 3 may operate at a low frequency, so that current consumption is reduced. Since the transmit frequency and the output frequency of the local oscillator 1 are different, the operation of the local oscillator 1 is prevented from being hindered by the transmit signal. Since these effects are achieved with a single local oscillator 1, the radio circuit is reduced in size and spurious emission due to the provision of a plurality of local oscillators does not occur.

The transmit frequency may equal the difference in frequency between the output signals of the local oscillator 1 and the frequency divider 2 and the phase comparison frequency of the local oscillator 1 may equal $\{f \times N/(N-1)\}/m$, wherein f is the transmit and receive frequency channel spacing and m is integer including 1. Moreover, the receive frequency may equal the difference between the output frequency of the local oscillator 1 and the first receive intermediate frequency and the phase comparison frequency of the local oscillator 1 may equal $\{f \times N/(N-1)\}/m$, wherein f is the transmit and receive frequency channel spacing and m is integer including 1.

Next, a radio circuit according to a third embodiment of the present invention will be described with reference to the drawings.

Figure 3:
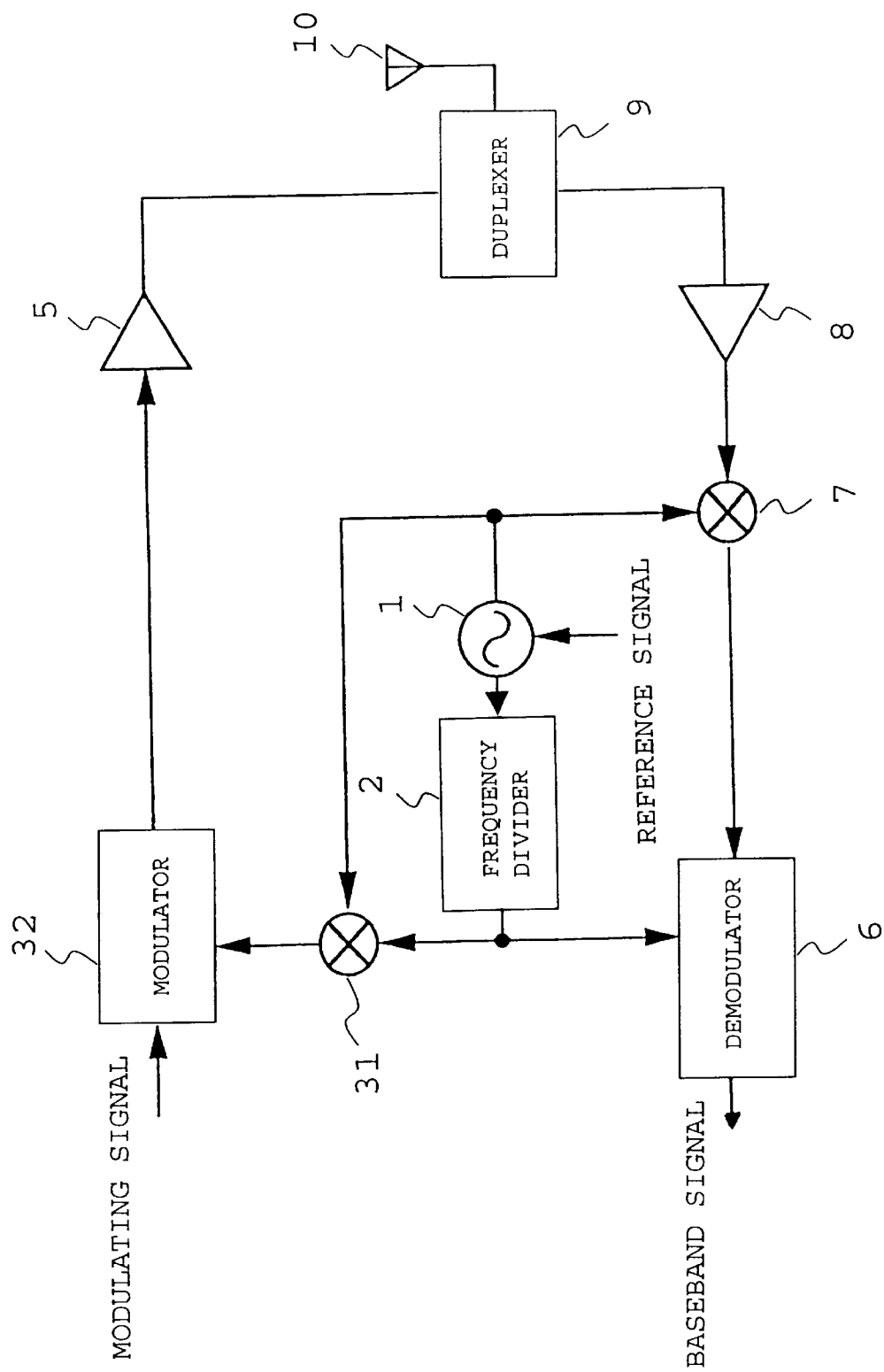
FIG. 3 is a construction view of a radio circuit according to a third embodiment of the present invention.

FIG. 3 shows the construction of the radio circuit according to the third embodiment of the present invention. In FIG. 3, the receiving section has a similar construction to that of FIG. 1 and the transmitting section has a different construction. The same elements as those of FIG. 1 are indicated by the same reference numerals and will not be described in detail. In FIG. 3, reference numeral 1 represents a local oscillator, reference numeral 2 represents a frequency divider, reference numeral 31 represents a local frequency converter, reference numeral 32 represents a modulator, reference numeral 5 represents a transmit amplifier, reference numeral 6 represents a demodulator, reference numeral 7 represents a receive frequency converter, reference numeral 8 represents a receive amplifier, reference numeral 9 represents a duplexer, and reference numeral 10 represents an antenna.

The output of the local oscillator 1 is input to the frequency divider 2, the local frequency converter 31 and the receive frequency converter 7. The frequency divider 2 frequency-divides the output of the local oscillator 1 and outputs it to the local frequency converter 31 and the demodulator 6. The receive signal received by the antenna 10 is passed through the duplexer 9, the receive amplifier 8 and the receive frequency converter 7 and demodulated into a baseband signal by the demodulator 6. The local frequency converter 31 outputs a signal of a transmit frequency to the modulator 32. The signal of the transmit frequency is modulated by the modulator 32 with a modulating signal, amplified by the transmit amplifier 5, passed through the duplexer 9 and sent out from the antenna 10.

The frequency division number of the frequency divider 2 is N and the transmit frequency equals the sum of the output frequency of the local oscillator 1 and the output frequency of the frequency divider 2. The receive frequency equals the sum of the output frequency of the local oscillator 1 and the output frequency of the frequency divider 2. The local oscillator 1 is a PLL frequency synthesizer which frequency-divides a reference signal into a phase comparison frequency. The phase comparison frequency equals $\{f \times N/(N+1)\}/m$, wherein f is the transmit and receive frequency channel spacing and m is integer including 1.

As described above, according to this embodiment, the receive signal is frequency-converted into a receive intermediate frequency with the output of the local oscillator 1 and demodulated with a signal obtained by frequency-dividing the output of the local oscillator 1. With this feature, the receive signal may be demodulated after being converted into a low-frequency signal, so that the realization of the demodulator 6 is facilitated and current consumption is reduced. Since the receive frequency and the output frequency of the local oscillator 1 are different, the leakage of the output signal of the local oscillator 1 from the antenna 10 is reduced. Moreover, since modulation is performed by use of the transmit frequency produced with the output of the local oscillator 1 and the frequency division output of the frequency divider 2, there is no transmit intermediate frequency, so that the construction of the transmitting section is simplified. Since the transmit frequency and the output frequency of the local oscillator 1 are different, the operation of the local oscillator 1 is prevented from being hindered by the transmit signal. Since these effects are achieved with a single local oscillator, the radio circuit is reduced in size and spurious emission due to the provision of a plurality of local oscillators does not occur.

The transmit frequency may equal the difference in frequency between the output signals of the local oscillator 1 and the frequency divider 2 and the phase comparison frequency of the local oscillator 1 may equal $\{f \times N/(N-1)\}/m$, wherein f is the transmit and receive frequency channel spacing and m is integer including 1. Moreover, the receive frequency may equal the difference in frequency between the outputs of the local oscillator 1 and the frequency divider 2 and the phase comparison frequency of the local oscillator 1 may equal $\{f \times N/(N-1)\}/m$, wherein f is the transmit and receive frequency channel spacing and m is integer including 1.

Next, a radio circuit according to a fourth embodiment of the present invention will be described with reference to the drawing.

Figure 4:
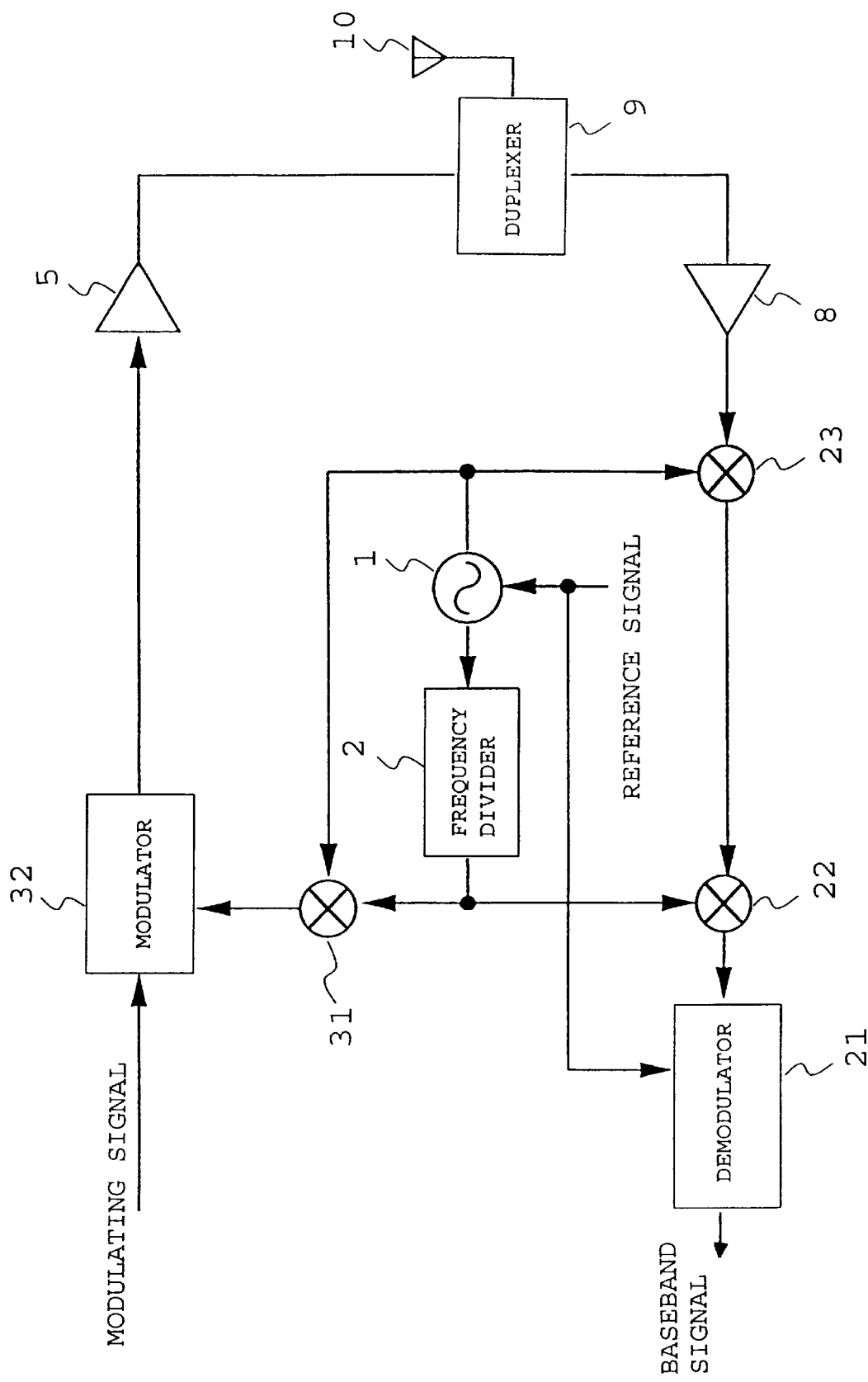
FIG. 4 is a construction view of a radio circuit according to a fourth embodiment of the present invention.
Figure 5:
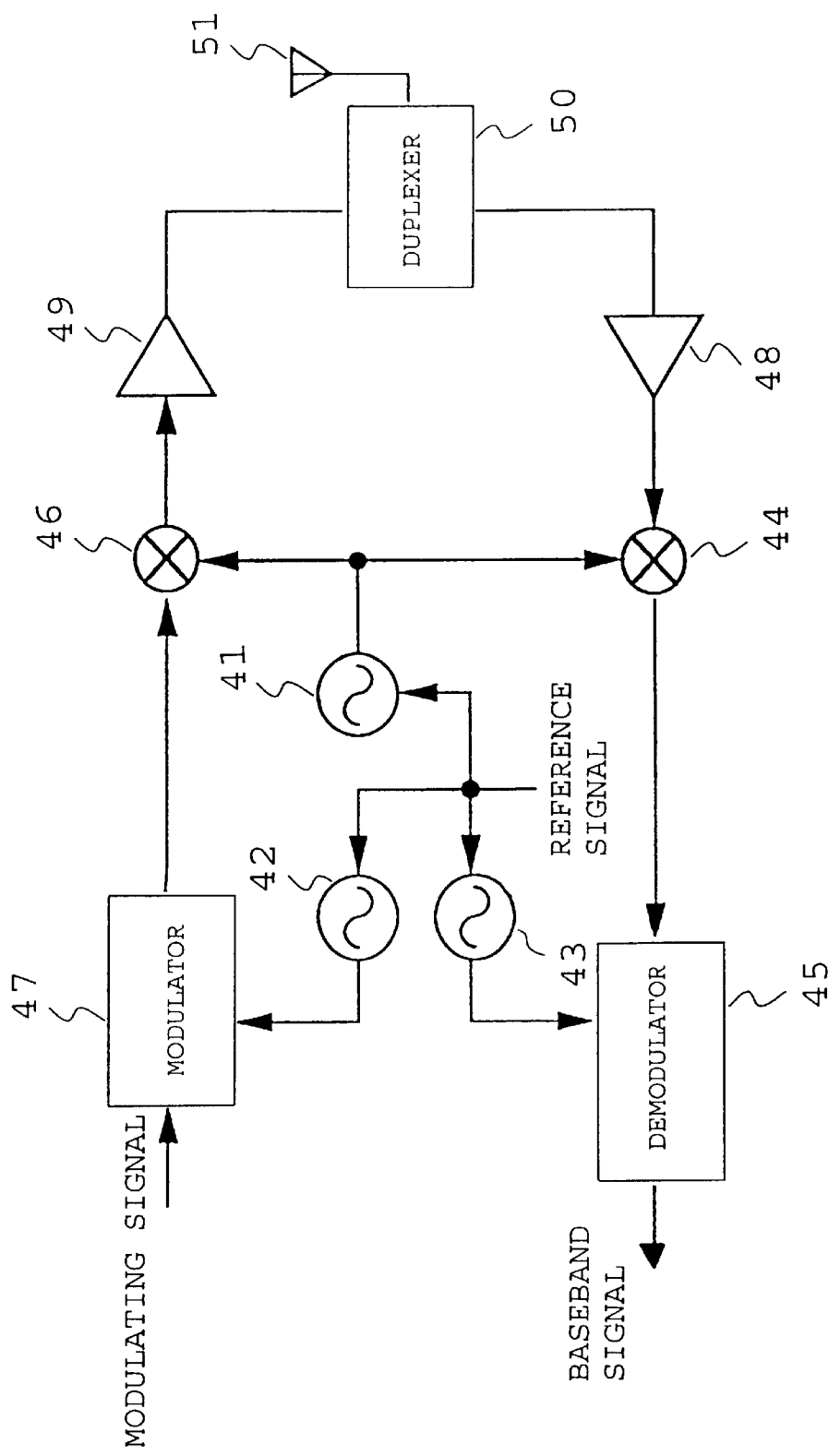
FIG. 5 is a construction view of a conventional radio circuit.

FIG. 4 shows the construction of the radio circuit according to the fourth embodiment of the present invention. The transmitting section of FIG. 4 has a similar construction to the transmitting section of FIG. 3 and the receiving section of FIG. 4 has a similar construction to the receiving section of FIG. 2. The same elements as those of FIG. 3 and FIG. 2 are indicated by the same reference numerals and will not be described in detail. Reference numeral 1 represents a local oscillator, reference numeral 2 represents a frequency divider, reference numeral 32 represents a modulator, reference numeral 5 represents a transmit amplifier, reference numeral 21 represents a demodulator, reference numeral 22 represents a second receive frequency converter, reference numeral 23 represents a first receive frequency converter, reference numeral 8 represents a receive amplifier, reference numeral 9 represents a duplexer, reference numeral 10 represents an antenna, and reference numeral 31 represents a local frequency converter.

The output of the local oscillator 1 is input to the frequency divider 2, the first receive frequency converter 23 and the local frequency converter 31.

The frequency divider 2 frequency-divides the output of the local oscillator 1 and outputs it to the local frequency converter 31 and the second receive frequency converter 22.

The local frequency converter 31 receives the output of the local oscillator 1 and the output of the frequency divider 2 to output a transmit frequency. The transmit frequency signal is modulated by the modulator 32 with a modulating signal, amplified by the transmit amplifier 5, passed through the duplexer 9 and sent out from the antenna 10.

The receive signal received by the antenna 10 is passed through the duplexer 9, amplified by the receive amplifier 8 and converted into a signal of a first receive intermediate frequency by the first receive frequency converter 23 with the output signal of the local oscillator 1. The signal converted into the first receive intermediate frequency is input to the second receive frequency converter 22 and converted into a second intermediate frequency signal with the output signal of the frequency divider 2. The second intermediate frequency is a fixed frequency equal to a reference signal. The signal of the second intermediate frequency is input to the demodulator 21 to be demodulated into a baseband signal with the reference signal.

The frequency division number of the frequency divider 2 is N and the transmit frequency equals the sum of the output frequency of the local oscillator 1 and the output frequency of the frequency divider 2. The receive frequency equals the sum of the output frequency of the local oscillator 1, the output frequency of the frequency divider 2 and the frequency of the reference signal. The local oscillator 1 is a PLL frequency synthesizer which frequency-divides the reference signal into a phase comparison frequency. The phase comparison frequency equals $\{f \times N/(N+1)\}/m$, wherein f is the transmit and receive frequency channel spacing and m is an integer including 1.

As described above, according to this embodiment, the receive signal is frequency-converted into the first receive intermediate frequency with the output of the local oscillator 1, frequency-converted into the second receive intermediate frequency with a signal obtained by frequency-dividing the output of the local oscillator 1, and demodulated into the baseband signal with the reference signal. With this feature, the receive signal may be demodulated after being converted into a low-frequency signal, so that the realization of the demodulator 21 is facilitated and current consumption is reduced. Since the second intermediate frequency is a fixed frequency, disturbing waves may be removed by providing a narrow-band band-pass filter at the entrance of the demodulator 21. Since the receive frequency and the output frequency of the local oscillator 1 are different, the leakage of the output signal of the local oscillator 1 from the antenna 10 is reduced.

Further, since modulation is performed by producing the transmit frequency by the local frequency converter receiving the output of the local oscillator 1 and the frequency division output of the frequency divider 2, there is no transmit intermediate frequency, so that the construction of the transmitting section is simplified. Since the transmit frequency and the output frequency of the local oscillator 1 are different, the operation of the local oscillator 1 is prevented from being hindered by the transmit signal. Since these effects are achieved with a single local oscillator, the radio circuit is reduced in size and spurious emission due to the provision of a plurality of local oscillators does not occur.

The transmit frequency may equal the difference in frequency between the output signals of the local. oscillator 1 and the frequency divider 2 and the phase comparison frequency of the local oscillator 1 may equal $\{f \times N/(N-1)\}/m$, wherein f is the transmit and receive frequency channel spacing and m is an integer including 1. Moreover, the receive frequency may equal the difference between the output frequency of the local oscillator 1 and the first receive intermediate frequency and the phase comparison frequency of the local oscillator 1 may equal $\{f \times N/(N+1)\}/m$, wherein f is the transmit and receive frequency channel spacing and m is integer including 1.

As described above, according to the present invention, a radio circuit suitable for size reduction and in which undesired spurious emission does not occur is realized by providing the local oscillator and the frequency divider for frequency-dividing the output of the local oscillator and by using a signal representative of the sum of or the difference between the frequencies of the outputs of the local oscillator and the frequency divider.

What is claimed is:

1. A radio circuit comprising a local oscillator at a local oscillator frequency, a first receive frequency converter, a second receive frequency converter, a frequency divider and a demodulator, wherein a receive signal and an output of the local oscillator are input to the first receive frequency converter, the receive signal is converted into a signal of a first intermediate frequency by the first receive frequency converter, the signal of the first intermediate frequency is input to the second receive frequency converter, the output of the local oscillator at the local oscillator frequency is frequency-divided by the frequency divider and input to the second receive frequency converter, the signal of the first intermediate frequency is frequency-converted into a signal of a second intermediate frequency by the second receive frequency converter, the signal converted into the second intermediate frequency and a reference signal of the local oscillator are input to the demodulator, the signal of the second intermediate frequency is demodulated into a baseband signal by the demodulator, and the frequency of the reference signal equals the second intermediate frequency.

2. A mobile radio apparatus comprising a radio circuit according to claim 1, a signal processing circuit for processing the modulating signal or the baseband signal, and an antenna for handling the receive signal or the transmit signal.

3. A radio circuit according to claim 1, further comprising a transmit frequency converter and a modulator, wherein the output of the local oscillator is input to the transmit frequency converter, an output of the frequency divider is input to the modulator to be modulated into a transmit intermediate frequency signal with a modulating signal, and the transmit intermediate frequency signal is input to the transmit frequency converter to be frequency-converted into a signal of a transmit frequency.

4. A radio circuit according to claim 3, wherein a frequency division number of the frequency divider is an integer N, a receive frequency or the transmit frequency is lower than an output frequency of the local oscillator, the local oscillator is a phase-locked loop frequency synthesizer circuit, and a phase comparison frequency is $f \times N/(N-1)$ or $\{f \times N/(N-1)\}/m$, wherein f is the transmit and receive frequency channel spacing and m is an integer including 1.

5. A radio circuit according to claim 3, wherein a frequency division number of the frequency divider is an integer N, a receive frequency or the transmit frequency is higher than an output frequency of the local oscillator, the local oscillator is a phase-locked loop frequency synthesizer circuit, and a phase comparison frequency is $f \times N/(N+1)$ or $\{f \times N/(N+1)\}/m$, wherein f is the transmit and receive frequency channel spacing and m is an integer including 1.

6. A radio circuit according to claim 1, further comprising a modulator and a local frequency converter, wherein the output of the local oscillator is input to the frequency divider to be frequency-divided, the local frequency converter receives the output of the local oscillator and an output of the frequency divider to output a signal of a transmit frequency, and the modulator modulates an output of the local frequency converter with a modulating signal to output a signal of the transmit frequency.

7. A radio circuit according to claim 6, wherein a frequency division number of the frequency divider is an integer N, a receive frequency or the transmit frequency is higher than an output frequency of the local oscillator, the local oscillator is a phase-locked loop frequency synthesizer circuit, and a phase comparison frequency is $f \times N/(N+1)$ or $\{f \times N/(N+1)\}/m$, wherein f is the transmit and receive frequency channel spacing and m is an integer including 1.

8. A radio circuit according to claim 6, wherein a frequency division number of the frequency divider is an integer N, a receive frequency or the transmit frequency is lower than an output frequency of the local oscillator, the local oscillator is a phase-locked loop frequency synthesizer circuit, and a phase comparison frequency is $f \times N/(N-1)$ or $\{f \times N/(N-1)\}/m$, wherein f is the transmit and receive frequency channel spacing and m is an integer including 1.

9. A radio circuit comprising a local oscillator at a local oscillator frequency, a first receive frequency converter, a frequency divider and a demodulator, wherein a receive signal and an output of the local oscillator are input to the first receive frequency converter, the receive signal is converted into a signal of a first intermediate frequency by the first receive frequency converter, the signal of the first intermediate frequency is input to the demodulator, and the output of the local oscillator at the local oscillator frequency is frequency-divided by the frequency divider and input to the demodulator, and the signal converted into the first intermediate frequency is demodulated into a baseband signal by the demodulator, said circuit further comprising a transmit frequency converter and a modulator, wherein the output of the local oscillator is input to the transmit frequency converter, an output of the frequency divider is input to the modulator to be modulated into a transmit intermediate frequency signal with a modulating signal, and the transmit intermediate frequency signal is input to the transmit frequency converter to be frequency-converted into a signal of a transmit frequency.

10. A radio circuit according to claim 9, wherein a frequency division number of the frequency divider is an integer N, a receive frequency or the transmit frequency is higher than an output frequency of the local oscillator, the local oscillator is a phase-locked loop frequency synthesizer circuit, and a phase comparison frequency is $f \times N/(N+1)$ or $\{f \times N/(N+1)\}/m$, wherein f is the transmit and receive frequency channel spacing and m is an integer including 1.

11. A radio circuit according to claim 9, wherein a frequency division number of the frequency divider is an integer N, a receive frequency or the transmit frequency is lower than an output frequency of the local oscillator, the local oscillator is a phase-locked loop frequency synthesizer circuit, and a phase comparison frequency is $f \times N/(N-1)$ or $\{f \times N/(N-1)\}/m$, wherein f is the transmit and receive frequency channel spacing and m is an integer including 1.

12. A radio circuit comprising a local oscillator at a local oscillator frequency, a frequency divider, a modulator and a local frequency converter, wherein an output of the local oscillator at the local oscillator frequency is input to the frequency divider to be frequency-divided, the local frequency converter receives the output of the local oscillator and an output of the frequency divider to output a signal of a transmit frequency, and the modulator modulates an output of the local frequency converter with a modulating signal to output a signal of the transmit frequency, said circuit further comprising a first receive frequency converter and a demodulator, wherein a receive signal and the output of the local oscillator are input to the first receive frequency converter, the receive signal is converted into a signal of a first intermediate frequency by the first receive frequency converter, the signal of the first intermediate frequency is input to the demodulator, the output of the local oscillator is frequency-divided by the frequency divider and input to the demodulator, and the signal converted into the first intermediate frequency is demodulated into a baseband signal by the demodulator.

13. A radio circuit according to claim 12, wherein a frequency division number of the frequency divider is an integer N, a receive frequency or the transmit frequency is higher than an output frequency of the local oscillator, the local oscillator is a phase-locked loop frequency synthesizer circuit, and a phase comparison frequency is $f \times N/(N+1)$ or $\{f \times N/(N+1)\}/m$, wherein f is the transmit and receive frequency channel spacing and m is an integer including 1.

14. A radio circuit according to claim 12, wherein a frequency division number of the frequency divider is an integer N, a receive frequency or the transmit frequency is lower than an output frequency of the local oscillator, the local oscillator is a phase-locked loop frequency synthesizer circuit, and a phase comparison frequency is $f \times N/(N-1)$ or $\{f \times N/(N-1)\}/m$, wherein f is the transmit and receive frequency channel spacing and m is an integer including 1.

* * * * *